United States Patent [19]

Kuehne et al.

[11] Patent Number: 5,484,531
[45] Date of Patent: Jan. 16, 1996

[54] PROCESS FOR THE REMOVAL OF INORGANIC SALTS

[75] Inventors: Norbert Kuehne, Haan, Germany; Manfred Biermann, Cincinnati, Ohio; Jochen Jacobs, Wuppertal; Ansgar Behler, Bottrop, both of Germany

[73] Assignee: Henkel Kommanditgesellschaft auf Aktien, Duesseldorf, Germany

[21] Appl. No.: 290,802

[22] PCT Filed: Feb. 8, 1993

[86] PCT No.: PCT/EP93/00298

§ 371 Date: Oct. 17, 1994

§ 102(e) Date: Oct. 17, 1994

[87] PCT Pub. No.: WO93/15826

PCT Pub. Date: Aug. 19, 1993

[30] Foreign Application Priority Data

Feb. 17, 1992 [DE] Germany ............... 42 04 700.5

[51] Int. Cl.⁶ .................................................. B01D 61/00
[52] U.S. Cl. .................. 210/653; 210/651; 210/641; 210/644; 210/654
[58] Field of Search ........................... 210/651, 641, 210/653, 654, 644; 8/527

[56] References Cited

U.S. PATENT DOCUMENTS

| | | | |
|---|---|---|---|
| 4,161,447 | 7/1979 | Kosima | 210/651 |
| 4,436,523 | 3/1984 | Hugelshofer et al. | 8/527 |
| 4,639,319 | 1/1987 | Schellenberg et al. | 210/651 |
| 5,176,834 | 1/1993 | Christian et al. | 210/651 |

FOREIGN PATENT DOCUMENTS

| | | |
|---|---|---|
| 2365609 | 4/1978 | France . |
| 3231299 | 3/1983 | Germany . |
| 2207618 | 2/1989 | United Kingdom . |

OTHER PUBLICATIONS

Römpp–Chemie–Lexikon, 9 edition, 1991 vol. 4, pp. 2769–2770.
Chem.–Ing. Tech. 57 (1985) Nr. 7, pp. 581–596.

*Primary Examiner*—Ana M. Fortuna
*Attorney, Agent, or Firm*—Ernest G. Szoke; Wayne C. Jaeschke; Daniel S. Ortiz

[57] ABSTRACT

The intention is a process for removing inorganic salts from aqueous mixtures of organic compositions capable of forming micelles. The aqueous mixture is subjected to ultrafiltration to remove the inorganic salts and recover the organic compositions in the retentate.

20 Claims, No Drawings

PROCESS FOR THE REMOVAL OF INORGANIC SALTS

FIELD OF THE INVENTION

This invention relates to a process for the removal of inorganic salts from aqueous solutions of organic salts or acids capable of micelle formation and, more particularly, to a process for the production of low-salt or salt-free solutions of anionic, cationic or amphoteric surfactants.

BACKGROUND OF THE INVENTION

Inorganic salts, such as sodium chloride or sodium sulfate or the like, can be formed as secondary products in the production of anionic, cationic or amphoteric surfactants and also nonionic surfactants. These inorganic salts can be troublesome in certain special applications, for example when any corrosion-promoting potential of the surfactant solution is to be strictly avoided or when salts influence the viscosity of the surfactant solution.

However, the removal of inorganic salts from organic acids or salts is difficult. For laboratory-scale and pilot-plant quantities, processes based on column chromatography may be applied or organic solvents may be used for precipitation. However, both processes are extremely complicated and do not always produce the required result.

Now, the problem addressed by the present invention was to provide an industrially workable process which would enable solutions of organic salts or acids capable of micelle formation to be freed from inorganic salts and also from other impurities incapable of micelle formation. In solving this problem, the invention makes use of the knowledge that, both in the ultrafiltration and in the reverse osmosis of solutions containing inorganic salts and organic salts or acids of the type mentioned, the inorganic salts pass over into the permeate while the organic salts or acids capable of micelle formation remain in the retentate. This is surprising insofar as the molecular weight of the organic salts or acids capable of micelle formation is lower than the cutoff molecular weight of the corresponding membranes, so that the expert had to assume that separation would not be possible in this case.

The surprising separation effect cannot be scientifically explained. However, it is assumed that secondary membrane formation and/or micelle formation are jointly responsible.

BRIEF SUMMARY OF THE INVENTION

Accordingly, the present invention relates to a process for the removal of inorganic salts from aqueous solutions of organic salts or acids capable of micelle formation, characterized in that the aqueous solutions are subjected to ultrafiltration or reverse osmosis and the organic salt or acids are recovered from the retentate.

In its broadest embodiment, the process according to the invention may be applied to surfactant solutions in which the surfactant concentration exceeds the critical micelle concentration, i.e. to surfactant solutions with a surfactant solids content of at least 1% by weight, preferably at least 10% by weight and more preferably at least 20% by weight. The upper limit to the surfactant solids content will be selected by the expert in such a way as to preclude any viscosity-related problems with the process. It may be at 40% by weight, 50% by weight and, in individual cases, at 60% by weight or 80% by weight. In a particularly preferred embodiment, solutions with a solids content of 10 to 50% by weight and, more particularly, 20 to 40% by weight are treated.

The process according to the invention is suitable for the substantial removal of salts from surfactant solutions. In addition, however, it may even be desirable instead of completely removing the salts merely to establish a defined residual salt content which is below the salt content of the starting product. Residual salt contents such as these are of interest when, in their subsequent use, the surfactant solutions are to be thickened by electrolytes and when products with a defined residual salt content are required to ensure the formulation remains consistent.

DETAILED DESCRIPTION OF THE INVENTION

The process according to the invention is suitable for organic salts or acids capable of micelle formation, i.e. anionic surfactants, cationic surfactants and/or amphoteric surfactants. However, it is also suitable for nonionic surfactants.

In the context of the invention, anionic surfactants are above all sulfonates and sulfates. From their production, they generally contain sodium sulfate as an impurity which, under adverse conditions, can crystallize out in the form of acicular water-containing crystals. The sulfonates include $C_{9-13}$ alkyl benzenesulfonates, olefin sulfonates, i.e. mixtures of alkene and hydroxyalkanesulfonates, and also the sulfonates obtained, for example, from $C_{12-18}$ monoolefins with a terminal or internal double bond by sulfonation with gaseous sulfur trioxide and subsequent alkaline or acidic hydrolysis of the sulfonation products. Alkanesulfonates obtained from $C_{12-18}$ alkanes, for example by sulfochlorination or sulfoxidation and subsequent hydrolysis or neutralization, may also be treated.

The esters of α-sulfofatty acids (ester sulfonates), for example the α-sulfonated methyl esters of hydrogenated coconut oil, palm kernel oil or tallow fatty acids, are also suitable for the process according to the invention. Esters of α-sulfofatty acids which have been obtained by α-sulfonation of the methyl esters of fatty acids of vegetable and/or animal origin containing 8 to 20 carbon atoms in the fatty acid molecule and subsequent neutralization to water-soluble monosalts are particularly suitable. Among these esters, α-sulfofatty acid alkyl esters with an alkyl chain containing no more than 4 carbon atoms in the ester group, for example methyl esters, ethyl esters, propyl esters and butyl esters, are important.

Other suitable anionic surfactants are the α-sulfofatty acids obtainable by ester cleavage of α-sulfofatty acid alkyl esters and also disalts of these α-sulfofatty acids. Mixtures of ester sulfonates and the above-mentioned diacids or disalts may of course also be used.

Another important class are anionic surfactants of the sulfate type, more particularly the sulfuric acid monoesters of primary alcohols of natural or synthetic origin. Important anionic surfactants are, for example, fatty alcohol sulfates, for example from coconut oil fatty alcohol, tallow fatty alcohol, oleyl alcohol, lauryl, myristyl, cetyl or stearyl alcohol or the $C_{10-20}$ oxoalcohols and also secondary alcohols with the same chain length. Sulfuric acid monoesters of alcohols of the above-mentioned type ethoxylated with 1 to 6 moles of ethylene oxide may also be treated in accordance with the invention. Sulfated fatty acid monoglycerides may also be used. Other anionic surfactants which may be treated by the process according to the invention are sulfosuccinic acid semiesters, sulfosuccinic acid diesters, alkyl ether phosphates, alkylphenol ether phosphates, alkyl isethionates, condensation products of hydroxyalkane and aminoalkanesulfonic acids and/or alkyl diphenylether sulfonates.

Another class of anionic surfactants are carboxy-methylated ethoxylates, i.e. the reaction products of ethoxylated alcohols with chloroacetic acid. The derivatives of amino acids, i.e. surfactants of the sarcoside type, are also suitable.

The process according to the invention may also be used for the purification of cationic surfactants. The most important cationic surfactants are the quaternary nitrogen compounds, of which the tetraalkyl ammonium salts, the N,N-dialkyl imidazolines and the N-alkyl pyridinium salts are particularly important.

The process according to the invention may also be used for the purification of amphoteric surfactants, for example betaine surfactants, which are obtained by the reaction of trialkylamines with at least one long-chain alkyl group and chloroacetic acid. The process may also be used for the purification of the sulfobetaines commonly used as amphoteric surfactants.

In addition to the ionic surfactants mentioned, nonionic surfactants may also be purified by the process according to the invention. Typical nonionic surfactants are the reaction products of long-chain alcohols with ethylene oxide or propylene oxide. Another important class of nonionic surfactants are the alkyl polyglycosides. In the case of nonionic surfactants, the purification problem often lies in the fact that inorganic impurities which have served as catalysts in the production process have to be removed. In this case, it may occasionally be necessary initially to convert the catalysts into a water-soluble form by addition of acids or basic compounds.

Finally, special surfactants may also be purified by the process according to the invention. Special surfactants are, for example, perfluorinated surfactants which are used either as anionic surfactants or as nonionic surfactants.

The surfactants mentioned generally have a molecular weight of at least 100 g/mole and, more particularly, in the range from 150 to 500 g/mole.

In one preferred embodiment of the process according to the invention, the surfactant solutions, which are generally aqueous solutions, are subjected to reverse osmosis with 0.0001 to 0,001 μm membranes under a pressure of 5 bar to 80 bar.

In another preferred embodiment of the invention, the aqueous solutions may be subjected to ultrafiltration with membranes having a pore diameter of 0,001 to 0.01 μm under pressures of 1 bar to 20 bar.

The membrane material used is not a critical factor in the process according to the invention and may therefore be freely selected by the expert. Thus, membranes of cellulose acetate, fluorine polymers, polysulfones, polyether sulfones, polyacrylates or zirconium dioxide may be used. Membranes of aluminium oxide or carbon membranes are also suitable.

EXAMPLE 10 kg of an approximately 30% aqueous solution of an amphoteric surfactant (reaction product of chloroacetic acid sodium salt with coconut oil alkyl dimethylamine) with the following composition:

NaCl: 6.6%
glycolic acid: 1.93%
Na chloroacetate: 0.37%
free amine: 0.17%
WAS (washing-active substances): 29.8 % are diluted with water in a ratio of 1:1 and subjected to membrane separation. By means of a pump, this solution is pumped under a pressure of 10 bar through polysulfone membranes with a cutoff of 5000.

The retentate is thickened to a volume of 10 l by removal of permeate (initial rate 70 $l.m^{-2}.h^{-1}$).

Diafiltration is then commenced, i.e. as much water is added as permeate is removed for a constant retentate volume.

The demand for diafiltration is determined by measurement in the electronic conductivity of the permeate, i.e. diafiltration is terminated when the desired salt content is reached.

In the case of this Example, diafiltration was terminated after the introduction of 12 liters of water.

To increase the WAS content, the required concentration can now be established solely by the removal of permeate.

In this Example, the WAS content was not increased and a product of the following composition was obtained:

NaCl: 0.25%
glycolic acid: 0.07%
Na chloroacetate: 0.02%
free amine: 0.07%
WAS: 29.9 %

We claim:

1. A process for the removal of inorganic salt from an aqueous mixture consisting essentially of said inorganic salt, and an organic composition caspable of micelle formation, said mixture containing the organic composition at a concentration above the critical micelle concentration, the process comprising: subjecting the aqueous mixture to ultrafiltration in an ultrafiltration membrane having a molecular weight cutoff higher than the molecular weight of the organic composition, and recovering the organic composition with a retentate and the inorganic salt with a permeate.

2. The process as claimed in claim 1, wherein the aqueous mixture comprises a solid content of 1 to 80% by weight.

3. The process of claim 2 wherein the aqueous mixture comprises a solid content of from 10 to 50% by weight.

4. The process of claim 3 wherein the ultrafiltration is followed by a dialysis of the retenate with water.

5. The process of claim 3 wherein the organic composition capable of micelle formation comprises at least one surfactant selected from the group consisting of anionic surfactants, cationic surfactants, nonionic surfactants and amphoteric surfactants.

6. The process of claim 5 wherein the anionic surfactants, cationic surfactants, nonionic surfactants and amphoteric surfactants comprise a molecular weight of at least 100 g/mole.

7. The process of claim 2 wherein the organic composition capable of micelle formation comprises a surfactant with a molecular weight of from 150 to 500 g/mole, and the ultrafiltration is carried out using an ultrafiltration membrane having a pore diameter of 0.001 to 0.01 μm.

8. The process of claim 7 followed by a dialysis of the retentate.

9. The process of claim 2 wherein the aqueous mixture comprises a solid content of from 20 to 40% by weight.

10. The process of claim 9 wherein the ultrafiltration is followed by a dialysis of the retentate with water.

11. The process of claim 9 wherein the organic composition capable of micelle formation comprises at least one surfactant selected from the group consisting of anionic surfactants, cationic surfactants, nonionic surfactants and amphoteric surfactants.

12. The process of claim 11 wherein the anionic surfactants, cationic surfactants, nonionic surfactants and amphoteric surfactants comprise a molecular weight of at least 100 g/mole.

13. The process as claimed in claim 1 wherein the ultrafiltration is followed by a dialysis of the retentate with water.

14. The process as claimed in claim 1 wherein the organic composition capable of micelle formation comprises at least one surfactant selected from the group consisting of anionic surfactants, cationic surfactants, nonionic surfactants and amphoteric surfactants.

15. The process as claimed in claim 14, wherein the anionic surfactants, cationic surfactants, nonionic surfactants and amphoteric surfactants comprise a molecular weight of at least 100 g/mole.

16. The process of claim 15 wherein the anionic surfactants, cationic surfactants, nonionic surfactants and amphoteric surfactants comprise a molecular weight of from 150 to 500 g/mole.

17. The process of claim 16 wherein the ultrafiltration is carried out using an ultrafiltration membrane having a pore diameter of from 0.001 to 0.01 µm followed by dialysis of the retentate with water.

18. The process of claim 17 wherein the ultrafiltration is carried out using at least one membrane comprising a material selected from the group consisting of cellulose acetate, fluorine polymers, polysulfones, polyether sulfones, polyacrylates, zirconium dioxide, aluminum oxide and carbon.

19. The process as claimed in claim 1 wherein the aqueous mixture is subjected to ultrafiltration with a membrane having a pore diameter of 0.001 to 0.01 µm under a pressure of 1 to 20 bar.

20. The process as claimed in claim 1, wherein the ultrafiltration is carried out using at least one membrane comprising a material selected from the group consisting of cellulose acetate, fluorine polymers, polysulfones, polyether sulfones, polyacrylates, zirconium dioxide, aluminum oxide and carbon.

* * * * *